US012496669B2

(12) United States Patent
Massone et al.

(10) Patent No.: US 12,496,669 B2
(45) Date of Patent: Dec. 16, 2025

(54) INTERCHANGEABLE CARRIER SYSTEM

(71) Applicant: Purem GmbH, Neunkirchen (DE)

(72) Inventors: Marco Massone, St. Wendel (DE);
Daniel Krenz, St. Wendel (DE)

(73) Assignee: Purem GmbH, Neunkirchen (DE)

( * ) Notice: Subject to any disclaimer, the term of this patent is extended or adjusted under 35 U.S.C. 154(b) by 472 days.

(21) Appl. No.: 18/047,923

(22) Filed: Oct. 19, 2022

(65) Prior Publication Data
US 2023/0122140 A1   Apr. 20, 2023

(30) Foreign Application Priority Data

Oct. 20, 2021  (DE) ..................... 10 2021 127 181.9

(51) Int. Cl.
*B23Q 3/06*   (2006.01)
*B23Q 3/10*   (2006.01)

(52) U.S. Cl.
CPC ............ *B23Q 3/061* (2013.01); *B23Q 3/103* (2013.01)

(58) Field of Classification Search
CPC ........ B23Q 1/0063–0091; B23Q 1/061; B23Q 1/102–103; B23Q 1/105–108; B25J 15/0433
See application file for complete search history.

(56) References Cited

U.S. PATENT DOCUMENTS

| 4,520,919 | A |   | 6/1985 | Keitaro |
| 4,645,173 | A | * | 2/1987 | Geiger ................... B23Q 16/08 248/500 |
| 2008/0196631 | A1 |   | 8/2008 | Kosmowski et al. |
| 2018/0001427 | A1 |   | 1/2018 | Hediger |
| 2021/0031363 | A1 |   | 2/2021 | Brenner et al. |
| 2021/0316412 | A1 |   | 10/2021 | Geissler et al. |
| 2021/0346998 | A1 |   | 11/2021 | Geissler et al. |
| 2021/0394323 | A1 |   | 12/2021 | Geissler et al. |

FOREIGN PATENT DOCUMENTS

| CN | 102066038 A | 5/2011 |
| CN | 112297052 A | 2/2021 |
| CN | 112638582 A | 4/2021 |

(Continued)

OTHER PUBLICATIONS

English translation of First Office action of the Chinese Patent Office dated May 31, 2025 in corresponding Chinese patent application 202211277871.9.

*Primary Examiner* — Tyrone V Hall, Jr.
(74) *Attorney, Agent, or Firm* — Walter Ottesen, P.A.

(57) ABSTRACT

An interchangeable carrier system, in particular for workstations for producing components for exhaust systems of internal combustion engines, includes a base unit and a carrier unit, which is to be releasably fixed to the base unit in a working position, wherein a coupling/fixing arrangement is provided on the base unit and a counterpart coupling/fixing arrangement, which can be brought into positive coupling engagement with the coupling/fixing arrangement during a sliding movement of the carrier unit in a sliding movement direction into the working position, is provided on the carrier unit, and wherein, when the carrier unit is positioned in the working position, the carrier unit can be fixed with respect to the base unit by the coupling/fixing arrangement.

15 Claims, 4 Drawing Sheets

(56) References Cited

FOREIGN PATENT DOCUMENTS

| | | |
|---|---|---|
| DE | 32 26 664 A1 | 2/1983 |
| DE | 44 17 857 A1 | 11/1995 |
| DE | 10 2011 080 502 A1 | 2/2013 |
| DE | 10 2011 080 504 A1 | 2/2013 |
| EP | 3 524 382 A1 | 8/2019 |

* cited by examiner

INTERCHANGEABLE CARRIER SYSTEM

CROSS REFERENCE TO RELATED APPLICATION

This application claims priority of German patent application no. 10 2021 127 181.9, filed Oct. 20, 2021, the entire content of which is incorporated herein by reference.

TECHNICAL FIELD

The present disclosure relates to an interchangeable carrier system which can be used in a particularly advantageous manner in workstations for producing components for exhaust systems of internal combustion engines.

BACKGROUND

In the production of components for exhaust systems of internal combustion engines, such as catalytic converters, particle filters or assembled structures including a plurality of such systems acting for exhaust gas purification, these components or component parts thereof are generally connected to one another by welding using welding robots. For this purpose, the components to be processed or produced in this way are positioned in workstations in such a way that the welding robots carrying out the joining operations have access to the component parts or components to be welded.

SUMMARY

In order to be able to arrange the components which are to be produced or processed in such workstations in the workstations, it is possible to use interchangeable carrier systems which include a base unit that is fixed to a workstation and a carrier unit which is to be connected to the base unit and carries the components which are to be processed or produced or component parts thereof, and it is an object of the present disclosure to provide an interchangeable carrier system of this kind via which it is possible to ensure rapid and reliable positioning of components which are to be processed in order to carry out work processes.

This object can, for example, be achieved by an interchangeable carrier system according to the disclosure, in particular for workstations for producing components for exhaust systems of internal combustion engines. This interchangeable carrier system includes a base unit and a carrier unit, which is to be releasably fixed to the base unit in a working position, wherein a coupling/fixing arrangement is provided on the base unit and a counterpart coupling/fixing arrangement, which can be brought into positive coupling engagement with the coupling/fixing arrangement during a sliding movement of the carrier unit in a sliding movement direction into the working position, is provided on the carrier unit, and wherein, when the carrier unit is positioned in the working position, the carrier unit can be fixed with respect to the base unit by the coupling/fixing arrangement.

In the interchangeable carrier system constructed according to the disclosure, when moving into the working position, the base unit and the carrier unit are first brought by the positive coupling engagement into a state in which the base unit and the carrier unit can then be firmly fixed to one another temporarily by the fixing action of the coupling/fixing arrangement in order to carry out work processes. Such an interchangeable carrier system is of simple construction and can be used universally and makes it possible to carry out processes for attaching a respective carrier unit to a base unit or for releasing a carrier unit from a base unit in a time-saving manner.

It should be noted that, for the purposes of the present disclosure, when a carrier unit is moved in the sliding movement direction, this carrier unit is moved in that movement direction in which the carrier unit approaches the working position and finally reaches it. In order to release a carrier unit from a base unit, that is, to move the carrier unit out of the working position, the carrier unit is moved with respect to the base unit in a direction opposite to the sliding movement direction.

For a defined movement of a carrier unit into the working position, it is proposed that a sliding guide formation is provided on the base unit and a counterpart sliding guide formation is provided on the carrier unit, wherein, when the carrier unit is moved in the sliding movement direction into the working position, the carrier unit is guided for movement in the sliding movement direction by the cooperation of the sliding guide formation with the counterpart sliding guide formation.

In an embodiment which is of simple construction but nevertheless acts reliably, one formation of the sliding guide formation and the counterpart sliding guide formation, preferably the sliding guide formation, can include two sliding guide recesses which are situated opposite one another transversely with respect to the sliding movement direction and are open toward one another and extend in the sliding movement direction, and the other formation of the sliding guide formation and the counterpart sliding guide formation, preferably the counterpart sliding guide formation, can include two sliding guide projections, which are oriented away from one another transversely with respect to the sliding movement direction and extend in the sliding movement direction, wherein, when the carrier unit is moved in the sliding movement direction in the direction of the working position, each sliding guide projection is received in a sliding guide recess for movement in the sliding movement direction.

To specify the working position of a carrier unit with respect to a base unit, a movement stop can be provided on the base unit and a counterpart movement stop can be provided on the carrier unit, wherein, when the carrier unit is moved in the sliding movement direction into the working position, the counterpart movement stop comes into contact with the movement stop when the working position is reached.

In order to be able to achieve both the positive coupling and the fixing via the coupling/fixing arrangement, it is proposed that the coupling/fixing arrangement includes a coupling member and the counterpart coupling/fixing arrangement includes a counterpart coupling member, wherein the coupling member has a coupling recess which is open counter to the sliding movement direction and forms a coupling undercut region transversely with respect to the sliding movement direction or/and in the sliding movement direction, and the counterpart coupling member has a coupling projection region, wherein, when the carrier unit is moved in the sliding movement direction into the working position and, at the same time, the counterpart coupling member is introduced into the coupling recess, the coupling projection region is positioned such that it engages in the coupling undercut region in such a way that the positive coupling engagement between the coupling member and the counterpart coupling member, which coupling engagement is effective in a coupling direction substantially orthogonal to the sliding movement direction, is produced.

It should be noted in this context that, for the purposes of the present disclosure, this positive coupling engagement is produced when or by virtue of the fact that the components involved are positioned so as to overlap or engage over one another in such a way that forces can be transmitted between the components involved, that is, the coupling member and the counterpart coupling member, in the direction in which the positive coupling engagement is effective, for example after they have approached one another and come into contact with one another when force is applied in the direction in which the positive coupling engagement is effective.

In a configuration which is simple to implement in terms of construction, the movement stop can include the coupling member, and the counterpart movement stop can include the counterpart coupling member.

To fix the carrier unit with respect to the base unit when the working position has been reached, the coupling member can be movable substantially orthogonally to the sliding movement direction in a fixing direction, which is substantially opposite to the coupling direction, in order to fix the carrier unit with respect to the base unit.

In order to be able to produce this movement, the coupling/fixing arrangement can include a coupling member drive for moving the coupling member at least in the fixing direction.

To obtain a configuration which is of mechanically simple construction yet reliable and fast-acting, it is proposed that the coupling member drive is a pressure fluid drive having a first pressure fluid chamber to be fed with pressure fluid in order to move the coupling member in the fixing direction.

In order also to be able to carry out the process of releasing a carrier unit from a base unit quickly and reliably, the coupling member drive can include a second pressure fluid chamber, which is to be fed with pressure fluid in order to move the coupling member in a direction opposite to the fixing direction. In this configuration, the coupling member drive configured as a pressure fluid drive is thus of double-acting configuration, and therefore no additional structural measures, such as preloading members or the like, are required in order to compel a movement of the coupling member, for example in the opposite direction to the fixing direction.

The coupling member drive can, for example, include a cylinder region, which is provided on a base body of the base unit, and a piston region, which is connected to the coupling member for joint movement and is accommodated movably in the cylinder region.

To specify a defined position of the carrier unit with respect to the base unit, it is possible to provide a rotational position specification arrangement for the purpose of specifying a rotational position of the carrier unit, which is positioned in the working position, with respect to the base unit about an axis which is substantially orthogonal to the sliding movement direction.

In order to supply pressure fluid to tools which are provided at the carrier station and are actuated by pressure fluid, for example in order to fix workpieces, or/and in order to transmit sensor signals relating to their operating state to the base unit, it is proposed that a connecting arrangement be provided to connect the carrier unit, which is positioned in the working position, to the base unit in order to transmit pressure fluid or/and electrical signals.

The disclosure further relates to a workstation, in particular for producing components for exhaust systems of internal combustion engines, including at least one, preferably a plurality of, interchangeable carrier systems constructed in accordance with the disclosure.

BRIEF DESCRIPTION OF THE DRAWINGS

The invention will now be described with reference to the drawings wherein.

DESCRIPTION OF THE PREFERRED EMBODIMENTS

Before the structure of an interchangeable carrier system is described in detail below with reference to FIGS. 1 to 5, which interchangeable carrier system can be used in a particularly advantageous manner, but not exclusively, to position components or component parts to be welded to one another for exhaust systems of internal combustion engines in a workstation, the basic structure of one example of such a workstation is explained with reference to FIG. 6.

Figure 1:
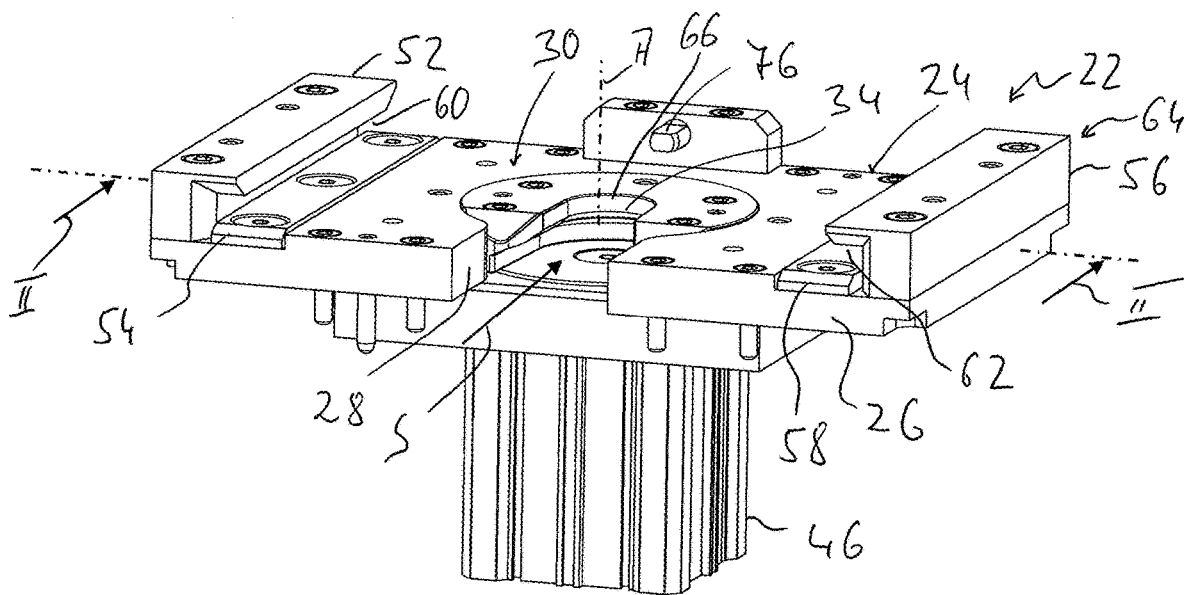
FIG. 1 shows a perspective view of a base unit of an interchangeable carrier system.
Figure 2:
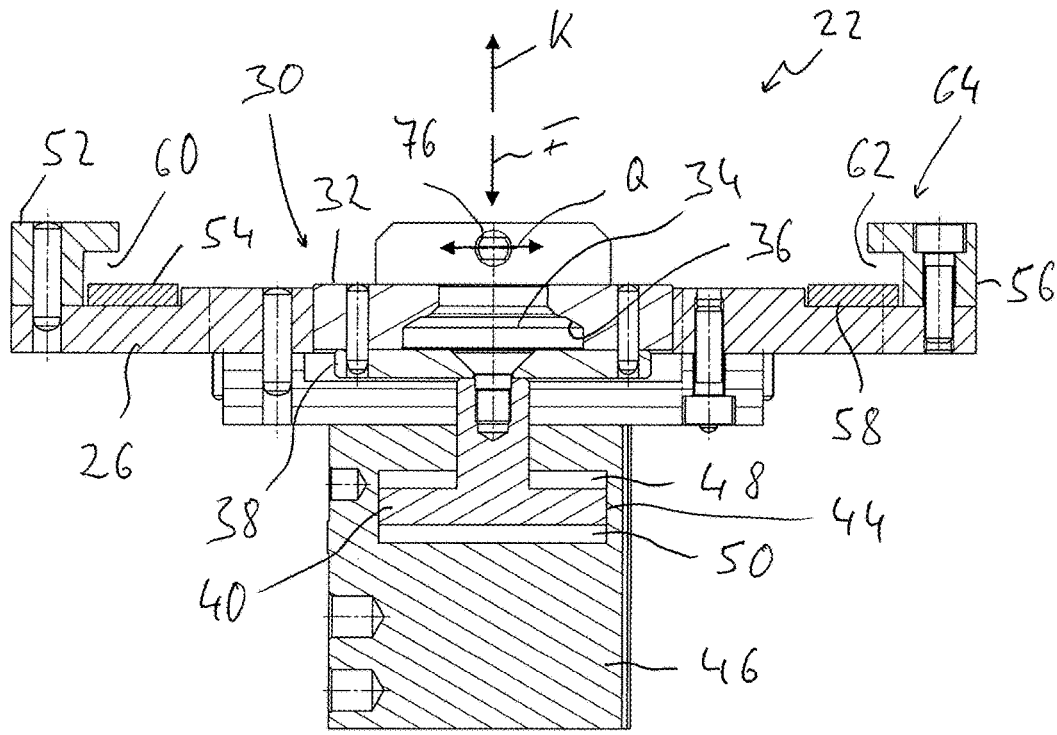
FIG. 2 shows a sectional view of the base unit of FIG. 1, sectioned along a line Il-Il in FIG. 1.
Figure 3:
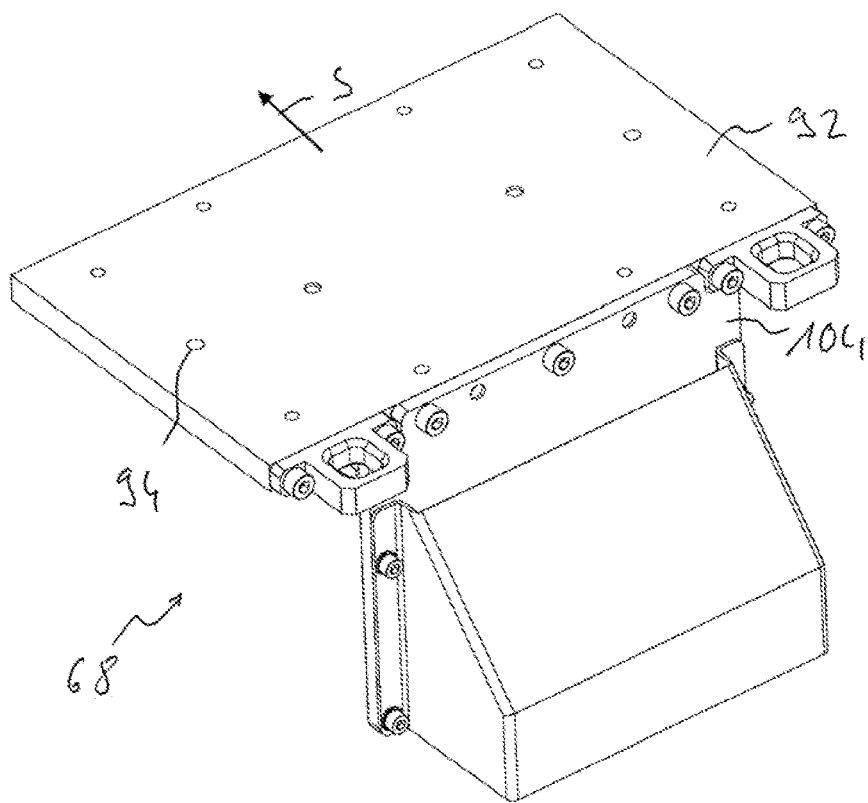
FIG. 3 shows a perspective view of a carrier unit of an interchangeable carrier system.
Figure 4:
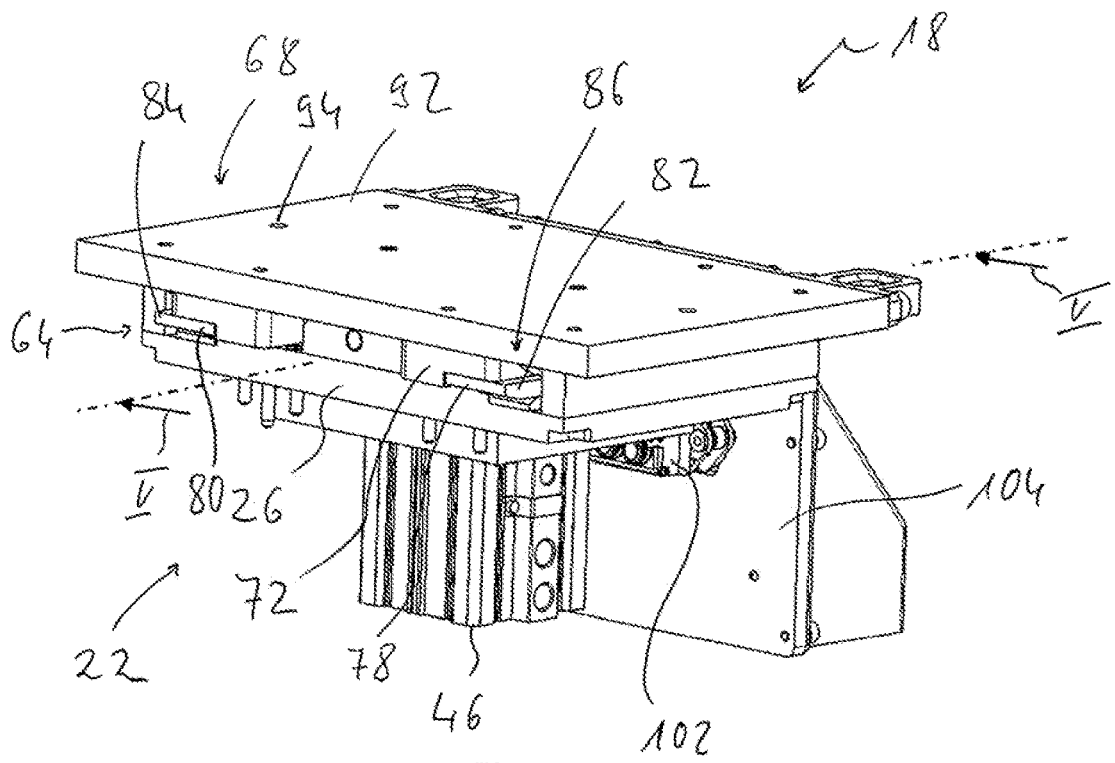
FIG. 4 shows a perspective view of the carrier unit of FIG. 3 coupled to the base unit of FIG. 1.
Figure 5:
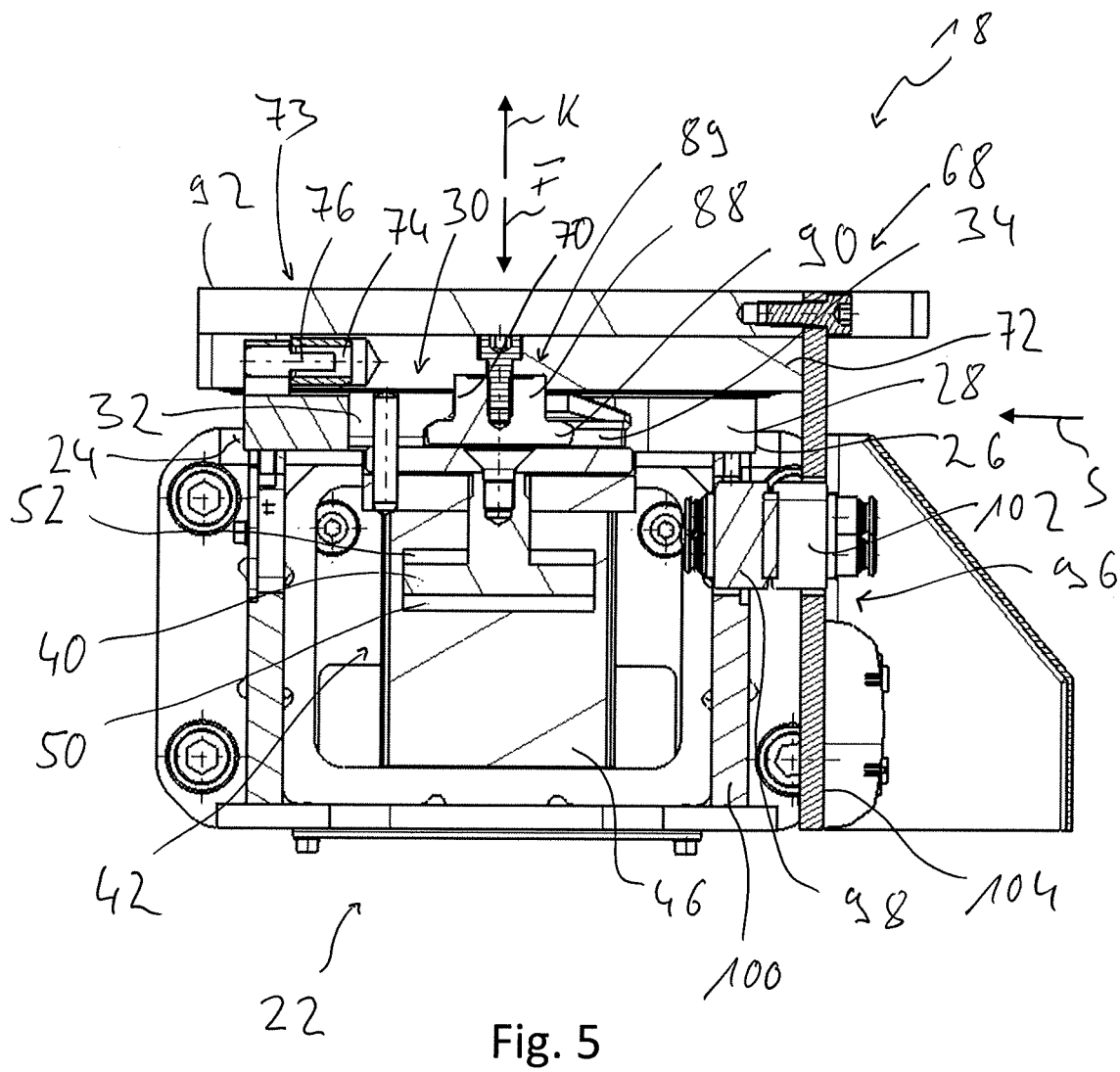
FIG. 5 shows a sectional view of the assembly illustrated in FIG. 4, sectioned along a line V-V in FIG. 4; and, FIG. 6 shows a basic illustration of a workstation with a plurality of interchangeable carrier systems provided thereon.
Figure 6:
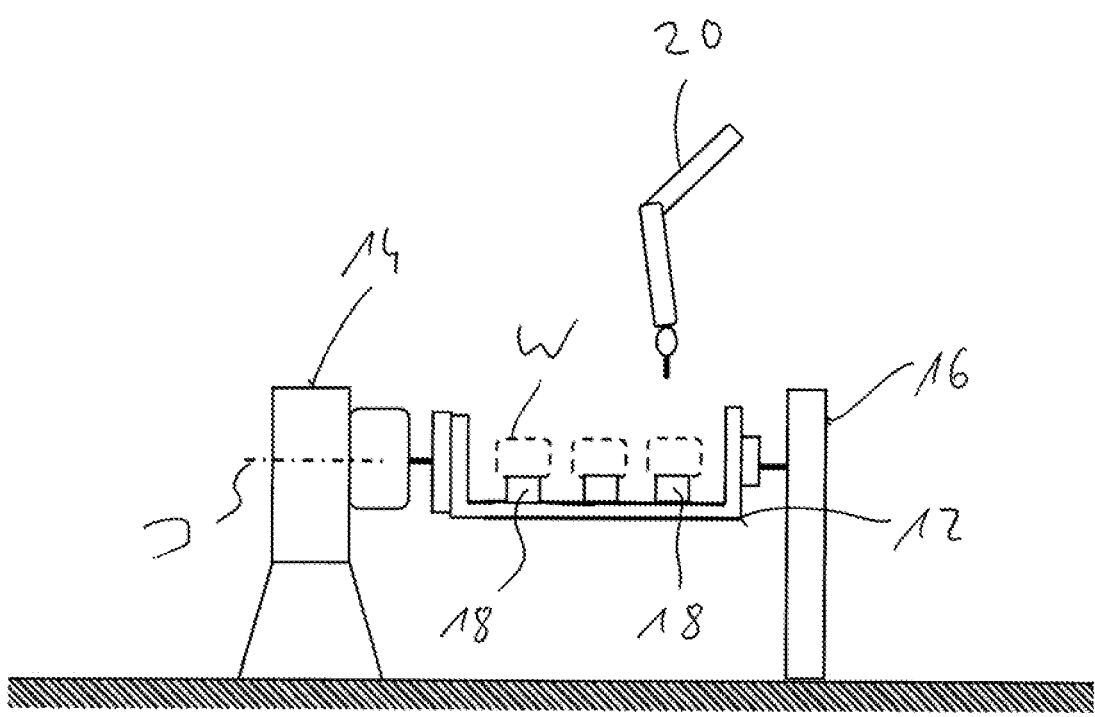

The workstation 10 illustrated by way of example in FIG. 6 includes a workpiece carrier subassembly 12 which can be driven by a drive subassembly 14 for rotation about an axis of rotation D. In one of its axial end regions, the workpiece carrier subassembly 12 is coupled to the drive subassembly 14. In the other axial end region, the workpiece carrier subassembly 12 is coupled to an abutment subassembly 16, ensuring that the workpiece carrier subassembly 12 is positioned or supported in a defined manner for rotation about the axis of rotation D.

In the example illustrated, three interchangeable carrier systems 18, which can preferably be of identical construction, are provided on the workpiece carrier subassembly 12 in succession in the direction of the axis of rotation D. Each interchangeable carrier system 18 carries as the workpiece Wa component for an exhaust system of an internal combustion engine or its component parts, for example, which are to be connected to one another by one or more welding robots 20.

Via the interchangeable carrier systems 18, the workpieces W can be positioned quickly and reliably on the workpiece carrier subassembly 12, in a manner described in detail below, in order to carry out the required work processes, in particular welding processes, and can be removed from the workpiece carrier subassembly just as quickly after these work processes have been carried out, in order then to position other workpieces on the workpiece carrier subassembly 12 so as to carry out such a work process again, for example.

Such an interchangeable carrier system 18 is illustrated with its essential system regions in FIGS. 1 to 5. The interchangeable carrier system 18 includes a base unit 22 illustrated in FIGS. 1 and 2 with a base body 24 constructed from a plurality of component parts. The base body 24 includes a base plate 26, in the central region of which a recess 28 for accommodating a coupling/fixing arrangement, denoted in general by 30, is provided.

The coupling/fixing arrangement 30 includes a coupling member 32, in which a coupling recess 34 is formed. The coupling recess 34 is open in a direction substantially opposite to a sliding movement direction S, which can be seen in FIG. 1 and will be explained below. In the region in which the coupling member 32 or the coupling recess 34 formed therein is open counter to the sliding movement direction S, the recess 28 formed in the base plate 26 is also open. The coupling recess 34 forms an undercut region 36 on the coupling member 32 in a direction Q transverse to the sliding movement direction S and in the sliding movement direction S.

A piston region 40 of a coupling member drive 42 configured as a pressure fluid drive is fixedly connected to the coupling member 32 via a connecting plate 38. The piston region 40 is accommodated in a movable manner in a cylinder region 44. In the cylinder region 44 formed in a cylinder block 46, a first pressure fluid chamber 48 and a second pressure fluid chamber 50 are formed, being separated from one another by the piston region 40. By feeding pressure fluid, for example, compressed air or a pressurized liquid, such as oil or the like, into the first pressure fluid chamber 48, the piston region 40 and with it the coupling member 32 are moved in a fixing direction F substantially orthogonal to the sliding movement direction S and to the direction Q, or subjected to a force acting in the fixing direction F. By feeding pressure fluid into the second pressure fluid chamber 50, the piston region 40 and with it the coupling member 32 are moved counter to the fixing direction F in a coupling direction K, which will be explained below, or subjected to a force acting in this direction. When pressure fluid is fed into one of the two pressure fluid chambers 48, 50, the other of the two pressure fluid chambers 48, 50 in each case is opened to allow a movement of the piston region 40 in order to release pressure fluid. For the supply of pressure fluid, a pressure fluid source, such as a compressor, pump or pressure fluid reservoir, can be provided, the pressure fluid being fed into the first pressure fluid chamber 48 or the second pressure fluid chamber 50, for example via a valve arrangement subject to the control action of a control unit, depending on the respective movement direction or force application direction to be provided.

Sliding guide recesses 60, 62 of a sliding guide formation, denoted in general by 64, of the base unit 22 are provided on the base plate 26 on both sides, with respect to the sliding movement direction S, of the coupling/fixing arrangement 30 by sliding guide parts 52, 54 and 56, 58, respectively, fixed thereto. The sliding guide recesses 60, 62 lie opposite one another in the direction Q transverse to the sliding movement direction S and are open toward one another and extend longitudinally over the same distance, preferably continuously without interruption, in the sliding movement direction S.

Furthermore, a rotational position specification arrangement 73 is provided on the base unit 22 or a carrier unit 68. The rotational position specification arrangement 73 includes, on a carrier plate 72 of the carrier unit 68, an opening 74 which is open in the sliding movement direction S and into which a pin 76, which is carried on the base plate 26 of the base unit 22 and projects counter to the sliding movement direction S, engages when the carrier unit 68 is positioned in the working position. With respect to the base unit 22, the carrier unit 68 is thus held in a defined rotational position about an axis A orthogonal to the sliding movement direction S and to the direction Q.

On its two end regions, which lie in the direction Q transverse to the sliding movement direction S, the carrier plate 72 carries guide plates 78, 80, which form sliding guide projections 82, 84 on the carrier plate 72 which are oriented away from one another in the direction Q and extend in the sliding movement direction S. Upon movement of the carrier unit 68 toward the base unit 22 in the sliding movement direction S, the sliding guide projections 82, 84 enter the sliding guide recesses 60, 62, which are basically open in the sliding movement direction S, and, if the sliding movement of the carrier unit 68 in the sliding movement direction S is continued, are guided therein. The sliding guide projections 82, 84 thus essentially provide a counterpart sliding guide formation 86, which, in cooperation with the sliding guide formation 64 having the sliding guide recesses 60, 62, brings about defined sliding movement guidance of the carrier unit 68 with respect to the base unit 22.

A counterpart coupling member 88, which is of substantially mushroom-like shape, is furthermore provided on the carrier plate 72 on a side of the latter which is to be positioned facing the base plate 26. The counterpart coupling member 88 essentially provides a counterpart coupling/fixing arrangement 89 and forms a coupling projection region 90 which is matched with regard to its shape and also its dimensioning to the shape and the dimensioning of the coupling undercut region 36 of the coupling member 32.

Upon movement of the carrier unit 68 toward the base unit in the sliding movement direction S, in particular if the sliding guide projections 82, 84 are guided in the sliding guide recesses 60, 62, the counterpart coupling member 88 enters the coupling recess 34 of the coupling member 32, the coupling projection region 90 simultaneously entering the coupling undercut region 36. As a result, the coupling member 32, with its region surrounding the coupling recess 34 and forming the coupling undercut region 36, engages over the coupling projection region 90 of the counterpart coupling member 88 on the side of the latter facing the carrier plate 72, and positive coupling engagement effective in the coupling direction K is produced between the coupling member 32 and the counterpart coupling member 88. It should be emphasized that, when the positive coupling engagement between the coupling member 32 and the counterpart coupling member 88 is produced by the movement of the carrier unit 68 into the working position, the counterpart coupling member 88 and the coupling member 32 do not necessarily have to be in contact with one another in the coupling direction K. There could in principle be a slight play therebetween for movement in the coupling direction K. In this state, a positive connection between the base unit 22 and the carrier unit 68, acting in the coupling direction K, could also prevent movement of the carrier unit 68 away from the base unit 22 in the coupling direction K, by virtue of the cooperation of the sliding guide projections 82, 84 with the sliding guide recesses 60, 62.

Defined positioning of the carrier unit 68 with respect to the base unit 22 in the sliding movement direction S is predetermined by a movement stop 66. This is provided essentially by the coupling member 32 with the coupling recess 34 formed therein. A counterpart movement stop 70 is provided essentially by the counterpart coupling member 88, which, when the working position is reached, is introduced into the coupling recess 34 to such an extent that the end thereof is reached and thus the counterpart coupling member 88 comes into contact with the coupling member 32.

After reaching the working position defined by the cooperation of the movement stop 66 with the counterpart movement stop 70, the carrier unit 68 could be released from the base unit 22 again in a direction counter to the sliding movement direction S. In order to prevent this, it is possible, after the working position and the positive coupling engagement, produced in principle during this process, between the coupling member 32 and the counterpart coupling member 88 have been achieved, for the coupling member drive 42 to be activated, for example, by manual input of an activation command. When the coupling member drive 42 is activated, pressure fluid is fed into the first pressure fluid chamber 48 and thus the coupling member 32 is moved in the fixing direction F, which is substantially opposite the coupling direction K, into the recess 28 formed in the base plate 26. During this movement, the coupling member 32 comes into contact with the counterpart coupling member 88, which is in positive coupling engagement with the latter in the coupling direction K, or the coupling member 32 takes along the counterpart coupling member 88 over which it engages, or subjects the latter to a force acting in the fixing direction F. As a result, the carrier plate 72 is moved toward the base plate 26 or subjected to a force acting in this direction. It is possible during this process for direct contact to arise between the carrier plate 72 and the base plate 26, or the guide plates 78, 80 provided on the carrier plate 72 and providing the sliding guide projections 82, 84 can be pressed against the plate-type sliding guide parts 54, 58, which together with the L-shaped sliding guide parts 52, 56 form the sliding guide recesses 60, 62.

Owing to the coupling engagement and the positive connection acting in the coupling direction K, the carrier unit 68 is fixed on the base unit 22 against a movement counter to the sliding movement direction S by the pressing action acting in the fixing direction F and the resulting nonpositive engagement or frictional engagement. In this state, such an interchangeable carrier system 18 can then be used for carrying out work processes, for example, welding processes, on workpieces carried thereon. For the attachment of such workpieces to the carrier unit 68, a workpiece plate 92 can be provided, for example, on the carrier plate 72, in which workpiece plate a plurality of fastening openings, configured, for example, as internally threaded openings, can be provided in order to secure workpieces on the workpiece plate 92 via suitable holders or holding tools provided for this purpose.

Such holding tools too can be actuated with pressure fluid, for example, compressed air. In order to be able to conduct pressure fluid into the region of the carrier unit 68, a connecting arrangement designated in general by 96 is provided. This includes a base connecting part 98, which is fixed to the base body 24, for example on a carrier structure 100 which carries the base plate 26. In association with the base connecting part 98, the connecting arrangement 96 includes a carrier connecting part 102 on the carrier unit 68. This can be carried on a plate 104 which is fixed to the workpiece plate 92 or/and the carrier plate 72 and which, when the carrier unit 68 is positioned in the working position, lies opposite the carrier structure 100 or the base connecting part 98.

When the carrier unit 68 approaches the working position or the working position is reached, the base connecting part 98 and the carrier connecting part 102 enter into interaction with one another, thus establishing a fluid exchange connection between a line region provided on the base unit 22 and a line region provided on the carrier unit 68. When the carrier unit 68 is positioned in the working position, a signal transmission connection for transmitting electrical signals, in particular sensor signals, between the carrier unit 68 and the base unit 22 can also be established via the connecting arrangement 96 in order to transmit sensor signals from sensors, which are arranged on the carrier unit 68 and detect, for example, correct holding of workpieces, to the base unit or to a control unit coupled thereto. Upon movement out of the working position, this connection is interrupted, it being possible, in particular to avoid fluid leakage in the region of the base unit, for valves provided on the base connecting part 98 to close off the line region provided on the base unit.

If, after completion of a working process, the carrier unit 68 is to be released from the base unit 22, the coupling member drive 42 can be controlled by the control unit in such a way that the coupling member 32 releases the counterpart coupling member 88, this being brought about in the embodiment shown by feeding pressure fluid into the second pressure fluid chamber 50 and moving the coupling member 32 counter to the fixing direction F, that is, in the coupling direction K. Thereupon, the carrier unit 68 can be removed from the base unit 22 counter to the sliding movement direction S, and another carrier unit 68 can be fixed to the same base unit 22.

With an interchangeable carrier system constructed according to the disclosure, it is possible, in a simple and rapidly executable manner, to fix a carrier unit to a base unit or to release it therefrom and to position workpieces to be processed, for example in a workstation, or to remove them therefrom after carrying out a work process, or to use a workstation for various work processes, for example for processing various workpieces, by using different types of carrier units. The interchangeable carrier system is of simple configuration and, owing to its fundamentally modular structure, leads to a reduction in the required bearing area for individual system regions thereof. Owing to the universal applicability of such an interchangeable carrier system, there is the possibility of providing identically constructed interchangeable carrier systems in a central procurement process even in internationally operating units, and this can contribute to considerable cost savings.

It is understood that the foregoing description is that of the preferred embodiments of the invention and that various changes and modifications may be made thereto without departing from the spirit and scope of the invention as defined in the appended claims.

What is claimed is:

1. An interchangeable carrier system comprising:
a base unit;
a carrier unit moveable relative to said base unit into a working position;
a coupling/fixing arrangement provided on said base unit and a counterpart coupling/fixing arrangement provided on said carrier unit;
said counterpart coupling/fixing arrangement being configured to be brought into positive coupling engagement with said coupling/fixing arrangement during a slide movement of said carrier unit in a slide movement direction (S) into said working position; and,
said coupling/fixing arrangement and said counter coupling/fixing arrangement being configured to fix said carrier unit with respect to said base unit when said carrier unit is positioned in said working second position;
a sliding guide formation provided on said base unit;
a counterpart sliding guide formation provided on said carrier unit;
said sliding guide formation and said counterpart sliding guide formation being configured to coact for providing a guided movement of said carrier unit in said slide movement direction (S) into said working position;
wherein one of:
said sliding guide formation comprises first and second sliding guide recesses extending in said slide movement direction (S) and disposed opposite one another transversely with respect to the slide movement direction (S) and open toward one another, and said counterpart sliding guide formation comprises first and second sliding guide projections extending in said slide movement direction (S) and orientated away from one another transversely with respect to said slide movement direction (S);
or
said counterpart sliding guide formation comprises first and second sliding guide recesses extending in said slide movement direction (S) and disposed opposite one another transversely with respect to the slide movement direction (S) and open toward one another, and said sliding guide formation comprises first and second sliding guide projections extending in said slide movement direction (S) and orientated away from one another transversely with respect to said slide movement direction (S);
wherein:
said first and second sliding guide projections are configured to be received in corresponding ones of said first and second sliding guide recesses for providing said guided movement of said carrier unit, when said carrier unit is moved in said slide movement direction (S) toward said working position;
said coupling/fixing arrangement includes a coupling member having a coupling recess open counter to said slide movement direction (S) and forming a coupling undercut region, said undercut region being at least one of transverse with respect to said slide movement direction (S) and in said slide movement direction (S);
said counterpart coupling/fixing arrangement includes a counterpart coupling member having a coupling projection region;
upon moving said carrier unit in said slide movement direction (S) into said working position with said first and second sliding guide projections engaging into said first and second sliding guide recesses for providing said guided movement of said carrier unit, said counterpart coupling member becomes introduced into said coupling member, such that said coupling projection region engages in said coupling undercut region for generating a positive coupling engagement between said coupling member and said counterpart coupling member, which positive coupling engagement is effective in a coupling direction (K) substantially orthogonal to said slide movement direction (S).

2. The interchangeable carrier system of claim 1, further comprising:
a movement stop provided on said base unit;
a counterpart movement stop provided on said carrier unit; and,
said counterpart movement stop being configured to come into contact with said movement stop when said carrier unit is moved in said slide movement direction (S) into said working position and when said working position is reached.

3. The interchangeable carrier system of claim 2, wherein said movement stop includes said first coupling member and said counterpart movement stop includes said counterpart coupling member.

4. The interchangeable carrier system of claim 1, wherein said coupling member is movable substantially orthogonally to said slide movement direction (S) in a fixing direction (F) to fix said carrier unit with respect to said base unit, which fixing direction (F) is substantially opposite to said coupling direction (K).

5. The interchangeable carrier system of claim 4, wherein said coupling/fixing arrangement includes a coupling member drive for moving said coupling member at least in said fixing direction (F).

6. The interchangeable carrier system of claim 5, wherein said coupling member drive is a pressure fluid drive having a first pressure fluid chamber to be fed with pressure fluid to move said coupling member in said fixing direction (F).

7. The interchangeable carrier system of claim 6, wherein said coupling member drive includes a second pressure fluid chamber, which is to be fed with pressure fluid to move said coupling member in a direction opposite to said fixing direction (F).

8. The interchangeable carrier system of claim 6, wherein said base unit has a base body; said coupling member drive includes a cylinder region provided on said base body; and, a piston region is connected to said coupling member for joint movement and is accommodated movably in said cylinder region.

9. The interchangeable carrier system of claim 1 further comprising a rotational position specification arrangement for specifying a rotational position of said carrier unit, positioned in said working second position, with respect to said base unit about an axis (A), said axis (A) being substantially orthogonal to said slide movement direction (S).

10. The interchangeable carrier system of claim 1 further comprising a connecting arrangement configured to connect said carrier unit, positioned in said working position, to said base unit to transmit at least one of: pressure fluid signals and electrical signals.

11. The interchangeable carrier system of claim 1, wherein the interchangeable carrier system is for a workstation for making components for exhaust systems for internal combustion engines.

12. The interchangeable carrier system of claim 1, wherein one of:
if said sliding guide formation comprises said first and second sliding guide recesses, said first and second sliding guide recesses are arranged on both sides, with respect to said sliding movement direction (S), of said coupling/fixing arrangement,
or
if said sliding guide formation comprises said first and second sliding guide projections, said first and second sliding guide projections are arranged on both sides, with respect to said sliding movement direction (S), of said coupling/fixing arrangement.

13. A workstation for producing components, the workstation comprising:
at least one interchangeable carrier system including:
a base unit;
a carrier unit movable relative to said base unit into a working position;
a coupling/fixing arrangement provided on said base unit and a counterpart coupling/fixing arrangement provided on said carrier unit;
said counterpart coupling/fixing arrangement being configured to be brought into positive coupling engagement with said coupling/fixing arrangement during a slide movement of said carrier unit in a slide movement direction (S) into said working position; and, said coupling/fixing arrangement and said counterpart coupling/fixing arrangement being configured to fix said carrier unit with respect to said base unit when said carrier unit is positioned in said working position;

a sliding guide formation provided on said base unit;

a counterpart sliding guide formation provided on said carrier unit;

said sliding guide formation and said counterpart sliding guide formation being configured to coact for providing a guided movement of said carrier unit in said slide movement direction (S) into said working position;

wherein one of:

said sliding guide formation comprises first and second sliding guide recesses extending in said slide movement direction (S) and disposed opposite one another transversely with respect to the slide movement direction (S) and open toward one another, and said counterpart sliding guide formation comprises first and second sliding guide projections extending in said slide movement direction (S) and orientated away from one another transversely with respect to said slide movement direction (S);

or said counterpart sliding guide formation comprises first and second sliding guide recesses extending in said slide movement direction (S) and disposed opposite one another transversely with respect to the slide movement direction (S) and open toward one another, and said sliding guide formation comprises first and second sliding guide projections extending in said slide movement direction (S) and orientated away from one another transversely with respect to said slide movement direction (S);

wherein:

said first and second sliding guide projections are configured to be received in corresponding ones of said first and second sliding guide recesses for providing said guided movement of said carrier unit, when said carrier unit is moved in said slide movement direction (S) toward said working position;

said coupling/fixing arrangement includes a coupling member having a coupling recess open counter to said slide movement direction (S) and forming a coupling undercut region, said undercut region being at least one of transverse with respect to said slide movement direction (S) and in said slide movement direction (S);

said counterpart coupling/fixing arrangement includes a counterpart coupling member having a coupling projection region;

upon moving said carrier unit in said slide movement direction (S) into said working position with said first and second sliding guide projections engaging into said first and second sliding guide recesses for providing said guided movement of said carrier unit, said counterpart coupling member becomes introduced into said coupling member, such that said coupling projection region engages in said coupling undercut region for generating a positive coupling engagement between said coupling member and said counterpart coupling member, which positive coupling engagement is effective in a coupling direction (K) substantially orthogonal to said slide movement direction (S).

14. The workstation of claim 13, wherein the workstation is for producing components for exhaust systems of internal combustion engines.

15. The workstation of claim 13, wherein one of:

if said sliding guide formation comprises said first and second sliding guide recesses, said first and second sliding guide recesses are arranged on both sides, with respect to said sliding movement direction (S), of said coupling/fixing arrangement, or if said sliding guide formation comprises said first and second sliding guide projections, said first and second sliding guide projections are arranged on both sides, with respect to said sliding movement direction (S), of said coupling/fixing arrangement.

\* \* \* \* \*